(12) United States Patent
Stephenson et al.

(10) Patent No.: US 12,522,699 B2
(45) Date of Patent: Jan. 13, 2026

(54) COMPOSITE MATERIALS

(71) Applicant: UEA ENTERPRISES LIMITED, Norwich (GB)

(72) Inventors: George Richard Stephenson, Norwich (GB); Kenneth Hamilton, Norwich (GB); Lloyd Henry Sayer, Norwich (GB); Paulina Cecylia Glowacka, Norwich (GB)

(73) Assignee: UEA ENTERPRISES LIMITED, Norwich (GB)

( * ) Notice: Subject to any disclaimer, the term of this patent is extended or adjusted under 35 U.S.C. 154(b) by 0 days.

(21) Appl. No.: 16/981,438

(22) PCT Filed: Mar. 21, 2019

(86) PCT No.: PCT/GB2019/050813
§ 371 (c)(1),
(2) Date: Sep. 16, 2020

(87) PCT Pub. No.: WO2019/180449
PCT Pub. Date: Sep. 26, 2019

(65) Prior Publication Data
US 2021/0147642 A1    May 20, 2021

(30) Foreign Application Priority Data
Mar. 21, 2018   (GB) ...................... 1804478

(51) Int. Cl.
*C08J 5/04*     (2006.01)
*D06M 13/203*   (2006.01)
(Continued)

(52) U.S. Cl.
CPC ........... *C08J 5/045* (2013.01); *D06M 13/203* (2013.01); *D06M 14/04* (2013.01);
(Continued)

(58) Field of Classification Search
CPC .... C08J 2301/02; C08J 5/045; D06M 13/203; D06M 13/188; D06M 2400/01; D06M 2101/06; D06M 14/04
See application file for complete search history.

(56) References Cited

U.S. PATENT DOCUMENTS 1,739,863 A * 12/1929  Rosenthal ............... C08B 37/00
                                                          536/63
3,432,252 A *  3/1969  Berni  .................. D06M 13/203
                                                          536/63
(Continued)

FOREIGN PATENT DOCUMENTS

AU      2012100558        6/2012
CA      2473319 A1        1/2006
(Continued)

OTHER PUBLICATIONS

Hadi Almasi et al., "Heterogeneous Modification of Softwoods Cellulose Nanofibers with Oleic Acid: Effect of Reaction Time and Oleic Acid Concentration," 16 Fibers and Polymers 1715-22 (2015).*
(Continued)

*Primary Examiner* — Michael F Pepitone
(74) *Attorney, Agent, or Firm* — Meunier Carlin & Curfman LLC

(57) ABSTRACT

Composite materials comprising a matrix in which are embedded reinforcing fibres and/or fabrics of modified cellulose and methods for making said composite materials.

19 Claims, 2 Drawing Sheets

(51) Int. Cl.
*D06M 14/04* (2006.01)
*D06M 101/06* (2006.01)

(52) U.S. Cl.
CPC ...... *C08J 2301/02* (2013.01); *D06M 2101/06* (2013.01); *D06M 2400/01* (2013.01)

(56) References Cited

U.S. PATENT DOCUMENTS

| | | | |
|---|---|---|---|
| 6,117,545 | A | 9/2000 | Cavaille et al. |
| 2010/0300330 | A1* | 12/2010 | Hamilton ............ C04B 20/1025 524/4 |
| 2013/0199409 | A1* | 8/2013 | Samain ...................... C08J 7/12 264/328.17 |

FOREIGN PATENT DOCUMENTS

| | | | | |
|---|---|---|---|---|
| CN | 106626468 | A | | 5/2017 |
| EP | 2832749 | A1 | | 2/2015 |
| JP | 2009249449 | | | 10/2009 |
| JP | 2014105407 | A | | 6/2014 |
| TW | I405741 | B | * | 8/2013 |
| WO | WO-9836117 | A1 | * | 8/1998 ............. D04H 1/56 |
| WO | 02/028795 | A2 | | 4/2002 |
| WO | 2011/150207 | A1 | | 12/2011 |
| WO | WO-2016071922 | A1 | * | 5/2016 ............. B65D 33/01 |
| WO | 2016197146 | | | 12/2016 |

OTHER PUBLICATIONS

Dankovich, "Surface modification of cellulose with plant triglyerides for hydrophobicity", Cellulose, 2007, 14:469-480 (Year: 2007).*
English machine translation of Hamilton et al. (TW I405741) (Year: 2013).*
Alonso-Esteban, J. I; González-Fernández, M. J.; Fabrikov, D.; Sánchez-Mata, M. C.; Torija-Isasa, E.; Guil-Guerrero, J. L. J. Food Compos. Anal. 2023, 115, 104962. (Year: 2023).*
Li, Xue & Tabil, Lope & Panigrahi, Satyanarayan. (2007). Chemical Treatments of Natural Fiber for Use in Natural Fiber-Reinforced Composites: A Review. Journal of Polymers and the Environment. 15. 25-33. 10.1007/s10924-006-0042-3.
M R, Sanjay & Siengchin, Suchart & Parameswaranpillai, Jyotishkumar & Jawaid, Mohammad & Pruncu, Catalin & Khan, Anish. (2018). A Comprehensive Review of Techniques for Natural Fibers as Reinforcement in Composites: Preparation, Processing and Characterization. Carbohydrate Polymers. 207. 10.1016/j.carbpol.2018.11.083.
International Search Report & Written Opinion mailed Jun. 28, 2019 for International application No. PCT/GB2019/050813.
GB Search Report of GB 1804478.4 mailed on Apr. 19, 2018.
Office Action received for EP AppIn No. 19 714 753.1-1107 mailed on May 4, 2023.

* cited by examiner

US 12,522,699 B2

COMPOSITE MATERIALS

CROSS-REFERENCE TO RELATED APPLICATIONS

This application is the 35 U.S.C. § 371 national stage application of PCT Application No. PCT/GB2019/050813, filed Mar. 21, 2019, which claims priority to and the benefit of GB Patent Application 1804478.4, filed Mar. 21, 2018, the entire disclosures of which are incorporated herein by reference.

TECHNICAL FIELD

The present invention generally relates to cellulose-based composite materials and to a process for the manufacture of cellulose-based composite materials. In particular, the present invention relates to modified cellulose products and the use of the modified cellulose products in composite materials.

As used herein, the expression "cellulose-based composite materials" particularly means composite materials in which modified cellulose fibres are used as reinforcing fibres, analogously to glass fibres in glass fibre composite materials.

BACKGROUND

Monteiro et al, "Selection of high strength natural fibers", Revista Materia, 2010, 15, page 488, cited in Mohammed et al, "A Review on Natural Fiber Reinforced Polymer Composite and its Applications", International Journal of Polymer Science, 2015, Article ID 243947, the contents of both of which are incorporated herein by reference, describes the use of cellulose-based composite materials in which modified cellulose fibres are used as a glass fibre replacement in the composite materials.

As examples of such research there may be cited:
Bengtsson et al, "Extrusion and mechanical properties of highly filled cellulose fibre-polypropylene composites", Composites: Part A, 2007, 38, page 1922; and
Zini and Scandola, "Green Composites: An Overview", Polymer Composites, 2011, page 1905;
the contents of both of which are incorporated herein by reference.

However, fundamental difficulties concerning low durability, low water resistance and poor structural strength and engineering performance has held back this potential application of cellulose, so that the potential of cellulose as a fibre in composite materials has so far not been fulfilled.

The present invention is based on our surprising finding that cellulose fibres and/or cellulosic fabrics that have been modified using one or more hydrocarbon chains, for example one or more hydrocarbon acids, can be used as reinforcing fibres in composite materials. The composite materials so formed are found to have good durability, good water resistance and good structural strength and engineering performance.

SUMMARY

According to a first aspect of the present invention, there is provided a composite material comprising a matrix having modified cellulose fibres and/or modified cellulosic fabric embedded therein, wherein the cellulose fibres and/or cellulosic fabric is modified with one or more hydrocarbon chain(s) having a carbon number of at least about 6.

According to a further aspect of the present invention, there is provided a composite material comprising a matrix having modified cellulose fibres and/or modified cellulosic fabric embedded therein, wherein the cellulose fibres and/or cellulosic fabric is modified with one or more hydrocarbon acids having a carbon number of at least about 6.

According to a further aspect of the present invention, there is provided a composite material comprising a matrix in which are embedded modified cellulose fibres and/or modified cellulosic fabric, wherein the modified cellulose and/or modified cellulosic fabric comprises a cellulosic sugar backbone in which one or more of the sugar units is or are provided with one or more hydrocarbon chain(s) covalently coupled to the said one or more sugar units, wherein the hydrocarbon chain(s) have a carbon number of at least about 6.

According to a further aspect of the present invention, there is provided a composite material comprising a matrix in which are embedded modified cellulose fibres and/or modified cellulosic fabric, wherein the modified cellulose and/or modified cellulosic fabric comprises a cellulosic sugar backbone in which one or more of the sugar units is or are provided with one or more hydrocarbon acid side chains covalently coupled to the said one or more sugar units via one or more ester linkage, wherein the hydrocarbon acid has a carbon number of at least about 6.

According to a second aspect of the present invention, there is provided an article of manufacture formed at least in part of a composite material comprising a matrix having modified cellulose fibres and/or modified cellulosic fabric embedded therein, wherein the cellulose fibres and/or cellulosic fabric is modified with one or more hydrocarbon chain(s) having a carbon number of at least about 6.

According to a further aspect of the present invention, there is provided an article of manufacture formed at least in part of a composite material comprising a matrix having modified cellulose fibres and/or modified cellulosic fabric embedded therein, wherein the cellulose fibres and/or cellulosic fabric is modified with one or more hydrocarbon acids having a carbon number of at least about 6.

According to a further aspect of the present invention, there is provided an article of manufacture formed at least in part of a composite material comprising a matrix in which are embedded modified cellulose fibres and/or modified cellulosic fabric, wherein the modified cellulose and/or modified cellulosic fabric comprises a cellulosic sugar backbone in which one or more of the sugar units is or are provided with one or more hydrocarbon chain(s) covalently coupled to the said one or more sugar units, wherein the hydrocarbon chain(s) have a carbon number of at least about 6.

According to a further aspect of the present invention, there is provided an article of manufacture formed at least in part of a composite material comprising a matrix in which are embedded modified cellulose fibres and/or modified cellulosic fabric, wherein the modified cellulose and/or modified cellulosic fabric comprises a cellulosic sugar backbone in which one or more of the sugar units is or are provided with one or more hydrocarbon acid side chains covalently coupled to the said one or more sugar units via one or more ester linkage, wherein the hydrocarbon acid has a carbon number of at least about 6.

According to a third aspect of the present invention, there is provided a method of forming a composite material comprising a matrix having modified cellulose fibres and/or modified cellulosic fabric embedded therein, wherein the method comprises: (1) modifying one or more cellulose fibres and/or cellulosic fabric by reacting the fibre and/or cellulosic fabric with one or more hydrocarbon chain(s) having a carbon number of at least about 6 under conditions capable of forming modified cellulose fibres and/or modified cellulosic fabric; and (2) embedding the one or more modified cellulose fibres and/or the modified cellulosic fabric modified by the procedure of (1) above in a matrix to obtain the composite material.

According to a further aspect of the present invention, there is provided a method of forming a composite material comprising a matrix having modified cellulose fibres and/or modified cellulosic fabric embedded therein, wherein the method comprises: (1) modifying one or more cellulose fibres and/or cellulosic fabric by reacting the fibre and/or cellulosic fabric with one or more hydrocarbon acids having a carbon number of at least about 6 under conditions capable of forming modified cellulose fibres and/or modified cellulosic fabric; and (2) embedding the one or more modified cellulose fibres and/or the modified cellulosic fabric modified by the procedure of (1) above in a matrix to obtain the composite material.

According to a further aspect of the present invention, there is provided a method of forming a composite material comprising a matrix in which are embedded modified cellulose fibres and/or modified cellulosic fabric, wherein the method comprises: (1) modifying one or more cellulose fibres and/or cellulosic fabric by reacting one or more cellulose fibres and/or cellulosic fabric with one or more hydrocarbon chain(s) under conditions capable of forming a modified cellulose and/or modified cellulosic fabric in which one or more of the sugar units of the cellulosic sugar backbone of the cellulose is provided with one or more hydrocarbon chain(s) covalently coupled to the said one or more sugar units, wherein the hydrocarbon chain(s) have a carbon number of at least about 6; and (2) embedding one or more modified cellulose fibres and/or modified cellulosic fabric modified by the procedure of (1) above in a matrix to obtain the composite material.

According to a further aspect of the present invention, there is provided a method of forming a composite material comprising a matrix in which are embedded modified cellulose fibres and/or modified cellulosic fabric, wherein the method comprises: (1) modifying one or more cellulose fibres and/or cellulosic fabric by reacting one or more cellulose fibres and/or cellulosic fabric with one or more hydrocarbon acids under conditions capable of forming a modified cellulose and/or modified cellulosic fabric in which one or more of the sugar units of the cellulosic sugar backbone of the cellulose is provided with one or more hydrocarbon acid side chains covalently coupled to the said one or more sugar units via one or more ester linkage, wherein the hydrocarbon acid has a carbon number of at least about 6; and (2) embedding one or more modified cellulose fibres and/or modified cellulosic fabric modified by the procedure of (1) above in a matrix to obtain the composite material.

According to a fourth aspect of the present invention, there is provided a method of obtaining an article of manufacture according to any aspect of the present invention, the method comprising forming a composite material using the method of any aspect of the present invention and, simultaneously with and/or subsequently to the said forming, shaping the composite material into the article of manufacture.

According to a fifth aspect of the present invention, there is provided a composite material obtained or obtainable by any aspect of the present invention.

According to a sixth aspect of the present invention, there is provided an article of manufacture obtained or obtainable by any aspect of the present invention.

According to a seventh aspect of the present invention, there is provided a modified cellulose fibre and/or modified cellulosic fabric for use in reinforcing a matrix of a composite material, wherein the modified cellulose fibre and/or modified cellulosic fabric is modified with one or more hydrocarbon chain(s) having a carbon number of at least about 6.

According to a further aspect of the present invention, there is provided a modified cellulose fibre and/or modified cellulosic fabric for use in reinforcing a matrix of a composite material, wherein the modified cellulose fibre and/or modified cellulosic fabric is modified with one or more hydrocarbon acids having a carbon number of at least about 6.

According to a further aspect of the present invention, there is provided a modified cellulose fibre and/or modified cellulosic fabric for use as a reinforcing fibre embedded in a matrix of a composite material, wherein the modified cellulose and/or modified cellulosic fabric comprises a cellulosic sugar backbone in which one or more of the sugar units is or are provided with one or more hydrocarbon chain(s) covalently coupled to the said one or more sugar units, wherein the hydrocarbon chain(s) have a carbon number of at least about 6.

According to a further aspect of the present invention, there is provided a modified cellulose fibre and/or modified cellulosic fabric for use as a reinforcing fibre embedded in a matrix of a composite material, wherein the modified cellulose and/or modified cellulosic fabric comprises a cellulosic sugar backbone in which one or more of the sugar units is or are provided with one or more hydrocarbon acid side chains covalently coupled to the said one or more sugar units via one or more ester linkage, wherein the hydrocarbon acid has a carbon number of at least about 6.

According to an eighth aspect of the present invention, there is provided a modified cellulose fibre and/or modified cellulosic fabric, wherein the modified cellulose fibre and/or modified cellulosic fabric is modified with one or more hydrocarbon chain(s) having a carbon number of at least about 6.

According to an further aspect of the present invention, there is provided a modified cellulose fibre and/or modified cellulosic fabric, wherein the modified cellulose fibre and/or modified cellulosic fabric is modified with one or more hydrocarbon acids having a carbon number of at least about 6.

According to an further aspect of the present invention, there is provided modified cellulose which comprises a cellulosic sugar backbone in which one or more of the sugar units is or are provided with one or more hydrocarbon chain(s) covalently coupled to the said one or more sugar units, wherein the hydrocarbon acid has a carbon number of at least about 6.

According to an further aspect of the present invention, there is provided modified cellulose which comprises a cellulosic sugar backbone in which one or more of the sugar units is or are provided with one or more hydrocarbon acid side chains covalently coupled to the said one or more sugar units via one or more ester linkage, wherein the hydrocarbon acid has a carbon number of at least about 6.

In certain embodiments of any aspect of the present invention, the modified cellulose fibre is in the form of a fabric (a cellulosic fabric). In certain embodiments, the one or more cellulose fibres are in the form of a fabric prior to modification with the one or more hydrocarbon acid side chains. The cellulosic fabric may, for example, be a woven cellulosic fabric.

In certain embodiments of any aspect of the present invention, the one or more hydrocarbon chain(s) preferably have a carbon number in the range of about 6 to about 30, preferably about 10 to about 30, preferably about 15 to about 25, more preferably about 18.

In certain embodiments of any aspect of the present invention, the one or more hydrocarbon acids preferably have a carbon number in the range of about 6 to about 30, preferably about 10 to about 30, preferably about 15 to about 25, more preferably about 18.

The details, examples and preferences provided in relation to any particular one or more of the stated aspects of the present invention will be further described herein and apply equally to all aspects of the present invention. Any combination of the embodiments, examples and preferences described herein in all possible variations thereof is encompassed by the present invention unless otherwise indicated herein, or otherwise clearly contradicted by context.

BRIEF DESCRIPTION OF THE FIGURES

The present invention may further be described with reference to the following non-limiting figures in which.

DETAILED DESCRIPTION

Figure 1:
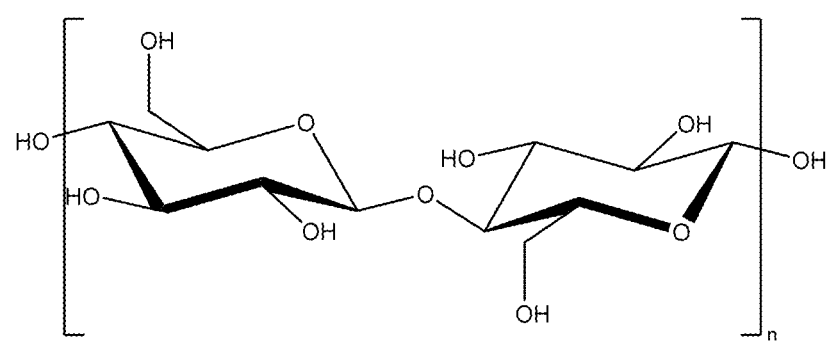
FIG. 1 shows a repeating unit of cellulose.

There is provided herein cellulose fibres and cellulosic fabrics that have been modified with one or more hydrocarbon chain(s), in particular one or more hydrocarbon acids, and composite materials comprising said modified cellulose fibres and modified cellulosic fabrics as reinforcing fibres. The cellulose fibres and/or cellulosic fabrics may have been modified to covalently link the one or more hydrocarbon chain(s) to the cellulose fibres and/or cellulosic fabric (e.g. covalently link the one or more hydrocarbon chains to the cellulose fibres in the cellulosic fabric).

The cellulose fibres and/or cellulosic fabrics may have been modified to covalently link the one or more hydrocarbon chain(s) to the cellulose fibres and/or cellulosic fabric by any suitable attachment functionality. The cellulose fibres and/or cellulosic fabrics may have been modified to covalently link the one or more hydrocarbon chain(s) to the cellulose fibres and/or cellulosic fabric by any bonding with one of the OH groups present on the sugar units in the cellulose fibres and/or cellulosic fabric or by replacing one of the OH groups present on the sugar units in the cellulose fibres and/or cellulosic fabric. In particular, the one or more hydrocarbon chain(s) may be covalently linked to the cellulose fibres and/or cellulosic fabric by bonding with one of the OH groups present on the sugar units in the cellulose fibres and/or cellulosic fabric.

For example, the one or more hydrocarbon chain(s) may be covalently linked to the cellulose fibres and/or cellulosic fabric by an ester linkage ((R—(CO)—O—R') or (R—O—(CO)—R')), an ether linkage (R—O—R'), a ketone linkage (R—(CO)—R'), a carbonate linkage (R—O—(CO)—O—R'), a peroxide linkage (R—O—O—R'), an anhydride linkage (R—(CO)—O—(CO)—R'), a glycerol triester linkage (R—O—CH$_2$—CH(OR")—CH$_2$—O—R''') wherein R" and R''' are each independently hydrocarbon chains, for example hydrocarbon chains having a carbon number of at least about 6 as defined herein or hydrocarbon acids having a carbon number of at least about 6 as defined herein), a glycerol phosphate diester linkage (R—O—(PO)(OH)—O—CH$_2$—CH(OR")—CH$_2$—O—R")' wherein R" and R''' are each independently hydrocarbon chains, for example hydrocarbon chains having a carbon number of at least about 6 as defined herein or hydrocarbon acids having a carbon number of at least about 6 as defined herein), a thioester linkage ((R—O—(CS)—R'), (R—S—(CO)—R'), (R—(CS)—O—R'), (R—(CO)—S—R'), (R—S—(CS)—R') or (R—(CS)—S—R')), a thioether linkage (R—S—R'), a thioketone linkage (R—(CS)—R'), a thiocarbonate linkage ((R—S—(CO)—O—R'), (R—O—(CS)—O—R'), (R—O—(CO)—S—R'), (R—S—(CO)—S—R') or (R—S—(CS)—S—R')), a disulfide linkage (R—S—S—R'), a thioanhydride linkage ((R—(CS)—O—(CO)—R'), (R—(CO)—S—(CO)—R'), (R—(CO)—O—(CS)—R'), (R—(CS)—S—(CO)—R'), (R—(CO)—S—(CS)—R'), (R—(CS)—O—(CS)—R') or (R—(CS)—S—(CS)—R')), an amide linkage ((R—(CO)—NR"—R') or (R—NR"—(CO)—R')), an imide linkage (R—(CO)—NR"—(CO)—R'), an amine linkage (R—NR"—R'), a hydrazine linkage (R—NR"—NR"—R'), a hydrazone linkage (R—N=NR"—R'), a urethane linkage ((R—O—(CO)—NR"—R') or (R—NR"—(CO)—O—R')), a urea linkage (R—NR"—(CO)—NR"—R'), a thioamide linkage ((R—(CS)—NR"—R') or (R—NR"—(CS)—R')), a thiourethane linkage ((R—S—(CO)—NR"—R'), (R—NR"—(CO)—S—R') or (R—NR"—(CS)—S—R')), a thiourea linkage (R—NR"—(CS)—NR"—R'), an oxime ether linkage (R—O—N=CR"—R'), a phosphate or phosphate ester linkage (R—O—(PO)(OR")—O—R'), a phosphonate linkage ((R—(PO)(OR")—O—R') or (R—O—(PO)(OR")—R')), a phosphinate linkage (R—(PO)(OR")—R'), a phosphine linkage (R—P(R")—R'), a phosphite linkage (RO—P(OR")—OR'), a sulfate linkage (R—O—(SO$_2$)—O—R'), a sulfonate linkage ((R—(SO$_2$)—O—R') or (R—O—(SO$_2$)—R')), a sulfone linkage (R—(SO$_2$)—R'), a sulfoxide (R—(SO)—R'), an oxysilane linkage ((R—O—Si(OR")(OR''')—O—R') or (R—O—Si(R")(R''')—O—R') or (R—O—Si(OR")(OR")—R') or (R—O—Si(R")(OR")—R') or (R—O—Si(R")(R")—R')), a silane linkage ((R—Si(OR")(OR")—O—R'), (R—Si(R")(OR")—O—R'), (R—Si(R")(R")—O—R'), or (R—Si(R")(R")—R')), an aminoalcohol linkage (R—O—CH$_2$—CH(OR")—CH$_2$N(R")—R'), an aminoacid or peptide linkage ((R—O—(CO)—CH(R")—N(R")—R') or (R—O—(CO)—CH(R")—N(R''')—((CO)—CH(R")—N(R'''))$_n$—R')), or a polyester or polylactic acid linkage ((R—O—[(CO)(CH$_2$)$_n$—O]$_n$—R') or (R—O—[(CO)(CHMe)-O]$_n$—R')). Unless otherwise stated, R is the cellulose fibre and/or fabric, R' is the hydrocarbon chain having a carbon number of at least about 6, (CO) is a carbonyl group (C=O), CS is a thiocarbonyl group (C=S), (PO) is (P=O), n and n' are integers, and R" and R''' are each independently a hydrogen or a functional group (e.g. a hydrocarbon chain (e.g. a hydrocarbon chain having a carbon number of at least about 6 as defined herein)).

Each functional group may, for example, independently be selected from a hydroxyl group, a hydrocarbon chain, a linear or branched chain alkyl group, a linear or branched chain alkenyl group, a linear or branched chain alkynyl group, a haloalkyl group, an ester group, an alkoxy group, a halogen group, a sulfonyl group (e.g. an alkylsulfonyl) group, a haloalkoxy group, =NH, —NH$_2$, and R'$_3$N- (amine) where R' is independently hydrogen, hydroxyl, halogen, optionally substituted alkoxyl, linear straight chain or branched alkyl, alkenyl, alkynyl, or an aryl group. In particular, each functional group may be a hydrocarbon chain, for example a hydrocarbon chain having a carbon number of at least about 6 as defined herein.

For example, the one or more hydrocarbon chain(s) may be covalently linked to the cellulose fibres and/or cellulosic fabric by an ester linkage (e.g. (R—O—(CO)—R')), an ether linkage (R—O—R'), a carbonate linkage (R—O—(CO)—O—R'), a peroxide linkage (R—O—O—R'), a glycerol triester linkage (R—O—CH$_2$—CH(OR")—CH$_2$—O—R''') wherein R" and R'" are each independently hydrocarbon chains, for example hydrocarbon chains having a carbon number of at least about 6 as defined herein or hydrocarbon acids having a carbon number of at least about 6 as defined herein), a glycerol phosphate diester linkage (R—O—(PO)(OH)—O—CH$_2$—CH(OR")—CH$_2$—O—R''') wherein R" and R'" are each independently hydrocarbon chains, for example hydrocarbon chains having a carbon number of at least about 6 as defined herein or hydrocarbon acids having a carbon number of at least about 6 as defined herein), a thioester linkage (e.g. (R—O—(CS)—R')), a thiocarbonate linkage (e.g. (R—O—(CS)—O—R') or (R—O—(CO)—S—R')), a urethane linkage (e.g. R—O—(CO)—NR"—R'), an oxime ether linkage (R—O—N=CR"—R'), a phosphate or phosphate ester linkage (e.g. R—O—(PO)(OR")—O—R'), a phosphonate linkage (e.g. (R—O—(PO)(OR")—R')), a sulfate linkage (e.g. R—O—(SO$_2$)—O—R'), a sulfonate linkage (e.g. (R—O—(SO$_2$)—R')), an oxysilane linkage (e.g. (R—O—Si(OR")(OR")—O—R') or (R—O—Si(R")(R")—O—R') or (R—O—Si(OR")(OR")—R') or (R—O—Si(R")(OR''')—R') or (R—O—Si(R")(R")—R')), an aminoalcohol linkage (e.g. R—O—CH$_2$—CH(OR")—CH$_2$N(R''')—R'), an aminoacid or peptide linkage (e.g. (R—O—(CO)—CH(R")—N(R")—R') or (R—O—(CO)—CH(R")—N(R''')-((CO)—CH(R")—N(R"))$_n$—R')), or a polyester or polylactic linkage (e.g. (R—O—[(CO)(CH$_2$)$_n$—O]$_n$—R') or (R—O—[(CO)(CHMe)-O]$_n$—R')).

The cellulose fibres and/or cellulosic fabrics may have been modified to covalently link the one or more hydrocarbon acids to the cellulose fibres and/or cellulosic fabric (e.g. covalently link the one or more hydrocarbon acids to the cellulose fibres in the cellulosic fabric), for example by an ester covalent linkage.

These modified cellulose fibres and/or modified cellulosic fabric advantageously provide improved durability, water resistance and structural strength/engineering performance. The modified cellulose fibres and/or cellulosic fabric are further advantageous in that they are a biomaterials, are recyclable and bioavailable, and in that they are relatively low cost and low weight.

Cellulose Backbone

Cellulose is a natural polymer of β(1→4) linked D-glucose units, of length varying from a few hundred to several thousand pyranose rings. FIG. 1 shows the repeating unit of cellulose. There are three reactive hydroxy groups in each glucose. Two consecutive glucose units are rotated at an angle of 180° in the plane from each other, due to the bond angle preferences of the bridging acetal (O—C—O) moieties, so that a single unit of the polymer consists of two glucose rings. The chain has an extensive hydrogen bonding network between the ring and side-chain hydroxyl groups both in the chain and between adjacent chains, giving stiffness and hence a degree of crystallinity to the polymer. As a consequence, solid state cellulose contains both amorphous (low order) and crystalline (high order) regions.

Cellulose chain length varies with the source. From wood pulp the length ranges from 300 to 1700 repeating units. Plant fibres, such as cotton, are 800 to 10,000 units. Microcrystalline celluloses of 150 to 300 units are prepared by chemical partial chain degradation of longer cellulose polymers.

The three hydroxyl groups present on each glucose component of the polymer are each able to undergo alkylation and acylation reactions using standard chemical reaction conditions. Methylcellulose can be prepared readily by treatment of an aqueous suspension of cellulose in water with sodium hydroxide, followed by addition of chloromethane or dimethyl sulfate. It is commercially available in a number of different degrees of methylation and chain length.

Cellulose may, for example, be extracted or obtained from plants and/or macroorganisms and/or microorganisms such as tunicates or bacteria using methods known to those skilled in the art. For example, cellulose may be extracted from one or more of flax, cotton, hemp, coir, jute, manila and wood pulp. Cellulose may be extracted by prehydrolysis with mineral acids or alkali followed by pulping (e.g. using NaOH), followed by bleaching (e.g. using sodium chlorite, hydrogen peroxide or ozone). Cellulose may also be obtained from commercial sources.

The cellulose fibres used to prepare the modified cellulose fibres described herein may, for example, be in the form of a fabric (cellulosic fabric). The term "fabric" refers to a material wherein a plurality of cellulose fibres are interlaced together, for example by weaving, knitting, knotting, felting, spreading, crocheting, looping, braiding, lacing, bonding or any other suitable methods. The fabric may, for example, be a woven fabric. The fabric may, for example, have a weight ranging from about 10 gsm to about 1000 gsm, for example from about 50 gsm to about 500 gsm, for example from about 100 gsm to about 400 gsm, for example from about 200 gsm to about 400 gsm. The fabric may, for example, comprise one or more different fibres in addition to the one or more cellulose fibres. For example, the fabric may comprise one or more polymer fibres, for example one or more polypropylene fibres, and/or one or more hemicellulose fibres and/or one or more lignin fibres in addition to the one or more cellulose fibres.

The cellulose used to prepare the modified cellulose fibres and/or modified cellulose fabric described herein may, for example, not be microfibrillated cellulose. The cellulose fibres (e.g. the cellulose fibres used to make the cellulosic fabric) may, for example, have an average diameter equal to or greater than about 1 μm, for example equal to or greater than about 10 μm, for example equal to or greater than about 20 μm. For example, the cellulose fibres (e.g. the cellulose fibres used to make the cellulosic fabric) may have an average diameter equal to or less than about 100 μm or equal to or less than about 75 μm or equal to or less than about 50 μm. The average diameter of the cellulose fibres may be measured by scanning electron microscopy (SEM).

The cellulose fibres may, for example, be derived from any suitable source. For example, the cellulose fibres may be derived from a natural source or may be man-made. For example, the cellulose may be derived from cotton, jute, flax, hemp, ramie, sisal, coconut husk, bamboo or a combination of one or more thereof. For example, the cellulose fibres may be man-made rayon fibres.

In certain embodiments, the cellulose fibres used to prepare the modified cellulose fibres described herein may be woven flax fibres (a flax fibre cellulosic fabric), which may, for example, be commercially available.

Hydrocarbon Chains/Hydrocarbon Acids

The term hydrocarbon chain refers to a hydrocarbon substituent (a substituent comprising or consisting of hydrogen and carbon atoms and optionally other functional groups, which may, for example, include heteroatoms such as oxygen, sulfur, nitrogen, phosphorous and halogens).

The hydrocarbon chain may not include any functional groups (i.e. consists of hydrogen and carbon atoms). Thus, the one or more hydrocarbon chain(s) used to modify the cellulose fibres and/or cellulosic fabric may be an alkane, an alkene, an alkyne, or an arene, in particular an alkane or an alkene. At least one of the hydrocarbon chain(s) used to modify the cellulose fibres and/or cellulosic fabric may be an alkane or an alkene. For example, all of the hydrocarbon chain(s) used to modify the cellulose fibres and/or cellulosic fabric may be an alkane or an alkene.

The hydrocarbon chain(s) may be linear (i.e. does not include any cyclic groups). The hydrocarbon chain(s) may, for example, be straight (i.e. non-branched) or branched linear hydrocarbon chain(s). At least one of the one or more hydrocarbon chain(s) used to modify the cellulose fibres and/or cellulosic fabric may be a linear hydrocarbon chain. For example, all of the hydrocarbon chain(s) used to modify the cellulose fibres and/or cellulosic fabric may be linear hydrocarbon chain(s). At least one of the one or more hydrocarbon chain(s) used to modify the cellulose fibres and/or cellulosic fabric may be a straight chain linear hydrocarbon chain. For example, all of the one of the one or more hydrocarbon chain(s) used to modify the cellulose fibres and/or cellulosic fabric may be straight chain linear hydrocarbon chain(s).

The hydrocarbon chain(s) may, for example, be aliphatic hydrocarbon chain(s). At least one of the one or more hydrocarbon chain(s) used to modify the cellulose fibres and/or cellulosic fabric may be an aliphatic hydrocarbon chain. For example, all of the hydrocarbon chain(s) used to modify the cellulose fibres and/or cellulosic fabric may be aliphatic hydrocarbon chain(s).

At least one of the one or more hydrocarbon chain(s) used to modify the cellulose fibres and/or cellulose fabric may be a linear aliphatic hydrocarbon chain. For example, all of the hydrocarbon chain(s) used to modify the cellulose fibres and/or cellulose fabric may be linear aliphatic hydrocarbon chain(s). One or more of the linear aliphatic hydrocarbon chain(s) may be unsaturated linear aliphatic hydrocarbon chain(s). At least one of the one or more hydrocarbon chain(s) used to modify the cellulose fibres and/or cellulose fabric may be a straight chain linear aliphatic hydrocarbon chain. For example, all of the hydrocarbon chain(s) used to modify the cellulose fibres and/or cellulosic fabric may be straight chain linear aliphatic hydrocarbon chain(s). One or more of the straight chain linear aliphatic hydrocarbon chain(s) may be unsaturated straight chain linear aliphatic hydrocarbon chain(s).

The hydrocarbon chain(s) may, for example, be hydrocarbon acid(s).

The term hydrocarbon acid refers to carboxylic acids (R—C(O) OH), where the R group is a hydrocarbon substituent (a substituent comprising or consisting of hydrogen and carbon atoms and optionally other functional groups, which may, for example, include heteroatoms such as oxygen, sulfur, nitrogen, phosphorous and halogens).

The hydrocarbon chain (R group) may not include any functional groups (i.e. consists of hydrogen and carbon atoms). Thus, the one or more hydrocarbon acid(s) used to modify the cellulose fibres and/or cellulosic fabric may be monobasic acid(s) (i.e. contain only one carboxylic acid group). At least one of the one or more hydrocarbon acid(s) used to modify the cellulose fibres and/or cellulosic fabric may be a monobasic acid. For example, all of the hydrocarbon acid(s) used to modify the cellulose fibres and/or cellulosic fabric may be monobasic acid(s).

The R group may be a linear hydrocarbon substituent (i.e. does not include any cyclic groups). The R group may, for example, be a straight (i.e. non-branched) or branched linear hydrocarbon substituent. At least one of the one or more hydrocarbon acid(s) used to modify the cellulose fibres and/or cellulosic fabric may be a linear hydrocarbon acid. For example, all of the hydrocarbon acid(s) used to modify the cellulose fibres and/or cellulosic fabric may be linear hydrocarbon acid(s). At least one of the one or more hydrocarbon acid(s) used to modify the cellulose fibres and/or cellulosic fabric may be a straight chain linear hydrocarbon acid. For example, all of the one of the one or more hydrocarbon acid(s) used to modify the cellulose fibres and/or cellulosic fabric may be straight chain linear hydrocarbon acid(s).

The R group may, for example, be an aliphatic hydrocarbon substituent. At least one of the one or more hydrocarbon acid(s) used to modify the cellulose fibres and/or cellulosic fabric may be an aliphatic hydrocarbon acid. For example, all of the hydrocarbon acid(s) used to modify the cellulose fibres and/or cellulosic fabric may be aliphatic hydrocarbon acid(s).

At least one of the one or more hydrocarbon acid(s) used to modify the cellulose fibres and/or cellulose fabric may be a linear aliphatic monobasic hydrocarbon acid. For example, all of the hydrocarbon acid(s) used to modify the cellulose fibres and/or cellulose fabric may be linear aliphatic monobasic hydrocarbon acid(s). One or more of the linear aliphatic monobasic hydrocarbon acid(s) may be unsaturated linear aliphatic monobasic hydrocarbon acid(s). At least one of the one or more hydrocarbon acid(s) used to modify the cellulose fibres and/or cellulose fabric may be a straight chain linear aliphatic monobasic hydrocarbon acid. For example, all of the hydrocarbon acid(s) used to modify the cellulose fibres and/or cellulosic fabric may be straight chain linear aliphatic monobasic hydrocarbon acid(s). One or more of the straight chain linear aliphatic monobasic hydrocarbon acid(s) may be unsaturated straight chain linear aliphatic monobasic hydrocarbon acid(s).

The hydrocarbon chains, for example hydrocarbon acids, described herein that are used to modify the cellulose fibres and/or cellulosic fabric (e.g. by covalent modification) have a carbon number of at least about 6. This means that the hydrocarbon chains, for example hydrocarbon acids, have at least about 6 carbon atoms. The hydrocarbon chains, for example hydrocarbon acids, described herein may, for example, have a carbon number equal to or less than about 30. For example, the hydrocarbon chains, for example hydrocarbon acids, may have a carbon number ranging from about 8 to about 30 or from about 10 to about 30 or from about 12 to about 28 or from about 15 to about 25 or from about 15 to about 20. For example, the hydrocarbon chains, for example hydrocarbon acids, may have a carbon number of 6, 7, 8, 9, 10, 11, 12, 13, 14, 15, 16, 17, 18, 19, 20, 21, 22, 23, 24, 25, 26, 27, 28, 29 or 30. For example, the hydrocarbon chains, for example hydrocarbon acids, may have a carbon number of 18.

One or more of the hydrocarbon chains, for example hydrocarbon acids, used to modify the cellulose fibres and/or cellulosic fabric may be unsaturated. The unsaturated hydrocarbon chain, for example hydrocarbon acid, may include one or more double bonds, for example two, three, four, five or six double bonds. For example, all of the hydrocarbon chains, for example hydrocarbon acids, used to modify the cellulose fibres and/or cellulosic fabric may be unsaturated.

The hydrocarbon chains or hydrocarbon acids described herein may, for example, be derived from a plant oil, for example a fatty acid derived from plant oil. For example, the hydrocarbon chains or hydrocarbon acids may be derived from linseed oil, soy-bean oil, rapeseed oil, hemp oil or a combination thereof. The plant oil may, for example, undergo hydrolysis (saponification) of triglycerides found in the plant oil in order to obtain the hydrocarbon acids that are used to modify the cellulose fibres and/or cellulosic fabrics as described herein. The plant oil may, for example, undergo hydrolysis (saponification) of triglycerides found in the plant oil, followed by further chemical reactions in order to obtain the hydrocarbon chains that are used to modify the cellulose fibres and/or cellulosic fabrics as described herein. Hydrolysis may occur by heating with potassium hydroxide in a solvent such as ethanol or aqueous ethanol. The reaction mixtures may be quenched by pouring into water and then may be extracted with ether or hexane and then acidification of the resulting salt solution. The resultant products may, for example, be referred to as acids, for example linseed acid, rapeseed acid, soybean acid and hempseed acid.

For example, linseed oil is a triglyceride including the hydrocarbon acids alpha-linolenic acid (e.g. about 51.9-55.2%), palmitic acid (e.g. about 7%), stearic acid (e.g. about 3.4-4.6%), oleic acid (e.g. about 18.5-22.6%) and linoleic acid (e.g. about 14.2-17%). The table below shows the wt % composition of different hydrocarbon acids in plant oils following saponification.

| Plant oil | Palmitic acid | Stearic acid | Oleic acid | Linoleic acid | α-Linolenic acid (ALA) | γ-Linolenic acid (GLA) | Stearidonic acid (SDA) | Total | % PUFA |
|---|---|---|---|---|---|---|---|---|---|
| hempseed | 5 | 2 | 9 | 56 | 22 | 4 | 2 | 100 | 84 |
| linseed | 6 | 3 | 15 | 15 | 61 | 0 | 0 | 100 | 76 |
| Rapeseed | 4 | | 60 | 23 | 13 | 0 | 0 | 100 | 36 |
| Soybean | 10 | 4 | 23 | 55 | 8 | 0 | 0 | 100 | 63 |

Therefore, the hydrocarbon acids may comprise one or more of linolenic acid (alpha and/or gamma), palmitic acid, stearic acid, oleic acid, linoleic acid and stearidonic acid. The structures of each are shown below.

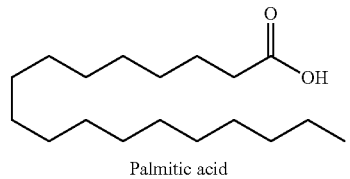

Palmitic acid

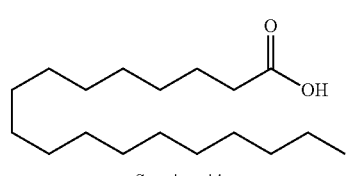

Stearic acid

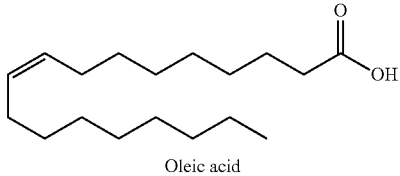

Oleic acid

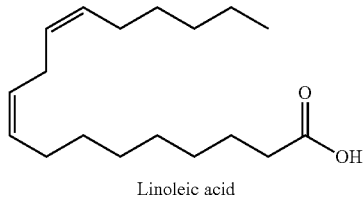

Linoleic acid

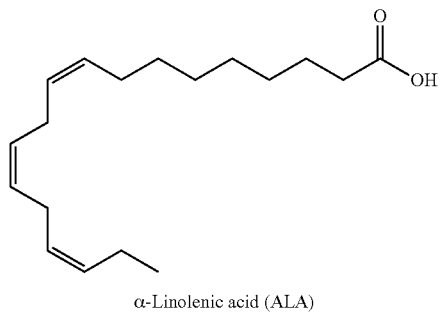

α-Linolenic acid (ALA)

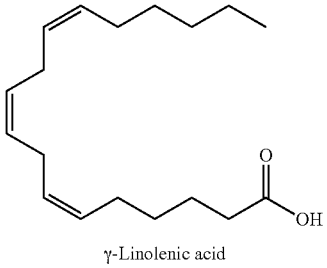

γ-Linolenic acid

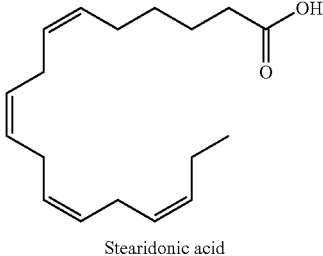

Stearidonic acid

In certain embodiments, the hydrocarbon acids comprise linoleic acid. For example, the hydrocarbon acids may comprise about 50 wt % to about 80 wt % linoleic acid, for example about 55 wt % to about 75 wt %, for example from about 58 wt % to about 74 wt % linoleic acid.

Matrix

The matrix may, for example, be a polymer matrix. The matrix may, for example, not be a cement matrix.

The resin used for the matrix of the composite material may, for example, be a biodegradable resin, meaning that it can be disintegrated by biological means (e.g. by enzymes and/or bacteria and/or fungi). The resin may, for example, be a biosourced resin. The resin may, for example, be biocompatible.

The resin may, for example, be selected from polyamides, polyureas, polyurethanes, polyanhydrides, poly(vinyl alcohol), poly(ethylene glycol), polyester resins (e.g. unsaturated polyester resins), polypropylene resins (PP), polylactic acid (PLA), poly($\varepsilon$-caprolactone), poly(alkylene succinate), epoxy resins, fatty acid-based resins, starch-based resins, cellulose-based resins (e.g. carboxymethylcellulose or hydroxyethyle cellulose), poly(amino acids) (e.g. poly (amino acids) with free carboxylic groups such as poly (aspartic acid) and poly(glutamic acid) or a combination of one or more thereof.

Methods of Modification

The cellulose fibres and/or cellulosic fabrics may be modified by any suitable method known to those skilled in the art. For example, the hydrocarbon chains may be linked to the cellulosic sugar backbone by any suitable method known to those skilled in the art.

The method may, for example, involve a homogenous method, wherein solvent systems are used which readily dissolve cellulose fibres, such as lithium chloride/dimethylacetamide (LiCl/DMA).

The method may, for example, involve a heterogenous method, for example on solid fibres in a solvent containing reactive agents. For example, the hydrocarbon chain(s) may be applied to the cellulose fibres and/or cellulosic fabric in aqueous solution or as an aqueous emulsion and then dried prior to covalent attachment to form a coating on the cellulose fibres and/or cellulosic fabric. The dried material may then be heated in order to covalently attach the hydrocarbon chain(s) to the cellulose fibres and/or cellulosic fabric.

The "degree of substitution" refers to the % of monomer units (e.g. anhydroglycose units in cellulose) having a hydrocarbon chain attached. The modified cellulose fibres and/or cellulosic fabric may, for example, have a degree of substitution of at least about 0.1%, for example at least about 0.5% or at least about 1%. For example, the cellulose fibres and/or cellulosic fabric may have a degree of substitution ranging from about 0.1% to about 100%, for example from about 0.1% to about 60% or from about 0.1% to about 50% or from about 0.1% to about 40% or from about 0.1% to about 30% or from about 0.1% to about 20% or from about 0.1% to about 15% or from about 0.1% to about 10%.

Methods of Acylation

The cellulose fibres and/or cellulosic fabrics may be modified by any suitable method known to those skilled in the art. For example, the hydrocarbon acids may be linked to the cellulosic sugar backbone by any suitable method known to those skilled in the art.

The acylation may, for example, involve a homogenous method, wherein solvent systems are used which readily dissolve cellulose fibres, such as lithium chloride/dimethylacetamide (LiCl/DMA).

The acylation may, for example, involve a heterogenous method, for example on solid fibres in a solvent containing reactive agents.

Acetylcellulose derivatives were first isolated by heating cotton in glacial acetic acid at 150-180° C. It is now normally made by activation with acetic acid and sulfuric acid, and then acetylation of the cellulose by addition of acetic anhydride. Triacetylcellulose is first formed and on subsequent hydrolysis, partial deacetylation occurs to give a varying average degree of substitution depending on conditions. Acetylcellulose is commercially available, with a loading of approximately 40% of available hydroxyl groups acetylated. Other ester derivatives of cellulose may be synthesised using organic anhydrides and many are commercially available, such as cellulose propionate and butyrate, and mixed esters such as cellulose acetate butyrate.

The cellulose fibres may, for example, undergo surface modification, where reactants can only access outer-OH groups on the material. Alternatively, solvents which penetrate the fibre, causing swelling and opening up of otherwise hidden-OH groups may be used. Solvent swelling occurs as a consequence of diffusion of the solvent into both the crystalline and amorphous regions of cellulose. Crystalline cellulose molecules possess strong intermolecular interactions-hydrogen bonding and hydrophobic character. These need to be disrupted by the solvent, while in the amorphous regions cellulose chains need to be disentangled. The % of accessible OH groups in the cellulose fibres used in the present invention may, for example, ranging from about 0.1% to about 100%. For example, the % of accessible OH groups may range from about 0.5% to about 90% or from about 1% to about 80% or from about 2% to about 70% or from about 3% to about 60% or from about 4% to about 50% or from about 5% to about 40% or from about 6% to about 30% or from about 7% to about 20% or from about 8% to about 15% or from about 9% to about 15% or from about 10% to about 15%.

Common solvents of low molecular weight can be divided into two groups-those that cause swelling of cellulose to a greater or lesser degree, and basically non-swelling solvents. Water and dimethyl sulfoxide (DMSO) are particularly powerful swelling agents. Other solvents which cause partial swelling include N,N-dimethylfomamide (DMF) and dimethylacetamide (DMA). This lower efficiency of swelling is due to their relative inability to efficiently disentangle or decrystallise cellulose. Protic solvents such as methanol or ethanol, and ethers such as dibutyl ether, tetrahydrofuran, and 1,4-dioxan are even poorer swelling agents for the same reason, but acyclic derivatives of ethylene glycol, such as 2-methoxyethanol and 2-ethoxyethanol are moderately good. Pyridine is a relatively poor swelling solvent for pure cellulose, but is excellent in wood pulp materials, as it dissolves lignin well. However it is an excellent swelling solvent in 50% mixtures with acetic anhydride for acetylation of cellulose fibres at 100° C. or more, although swelling of up to 8.8% only is seen at room temperature. Non-swelling agents include acetone and ethyl acetate. Dichloromethane (DCM) and/or tetrahydrofuran (THF) may also be used as a solvent. DMF and DMSO may, for example, be preferred solvents for the described methods for modification of cellulose fibres and/or cellulosic fabrics.

The use of a solvent may, for example, increase the % of accessible OH groups and/or increase the degree of substitution by at least about 1% or at least about 2% or at least about 3% or at least about 4% or at least about 5% or at least about 10% or at least about 15% or at least about 20% or at least about 25% or at least about 30% or at least about 35% or at least about 40% or at least about 45% or at least about 50%.

One or more ester coupling reagents known to persons skilled in the art may be used to assist in the esterification of the hydroxyl groups in the cellulose fibres and/or cellulosic fabrics, for example in the glucose in the cellulosic fibres.

The ester coupling reagents may, for example, be selected from active esters, tertiary amines, carbodiimides, carbonyldiimidazole derivatives, phosgene derivatives, phosphonium salts, uranium salts, formamidinium salts or a combination of one or more thereof.

For example, the ester coupling reagents may be selected from N-ethyl-N'-(3-dimethylaminopropyl) carbodiimide hydrochloride (EDC), carbonyl diimidazole (CDI), dicyclohexylcarbodiimide (DCC), diisopropylcarbodiimide (DIC) and 4-dimethylaminopyridine (DMAP). For example, the ester coupling reagents may include DMAP. For example, the ester coupling reagents may include DCC and DMAP. For example, the ester coupling reagents may include EDS and DMAP.

For example, the reaction may proceed in a manner similar to that shown in the reaction scheme below.

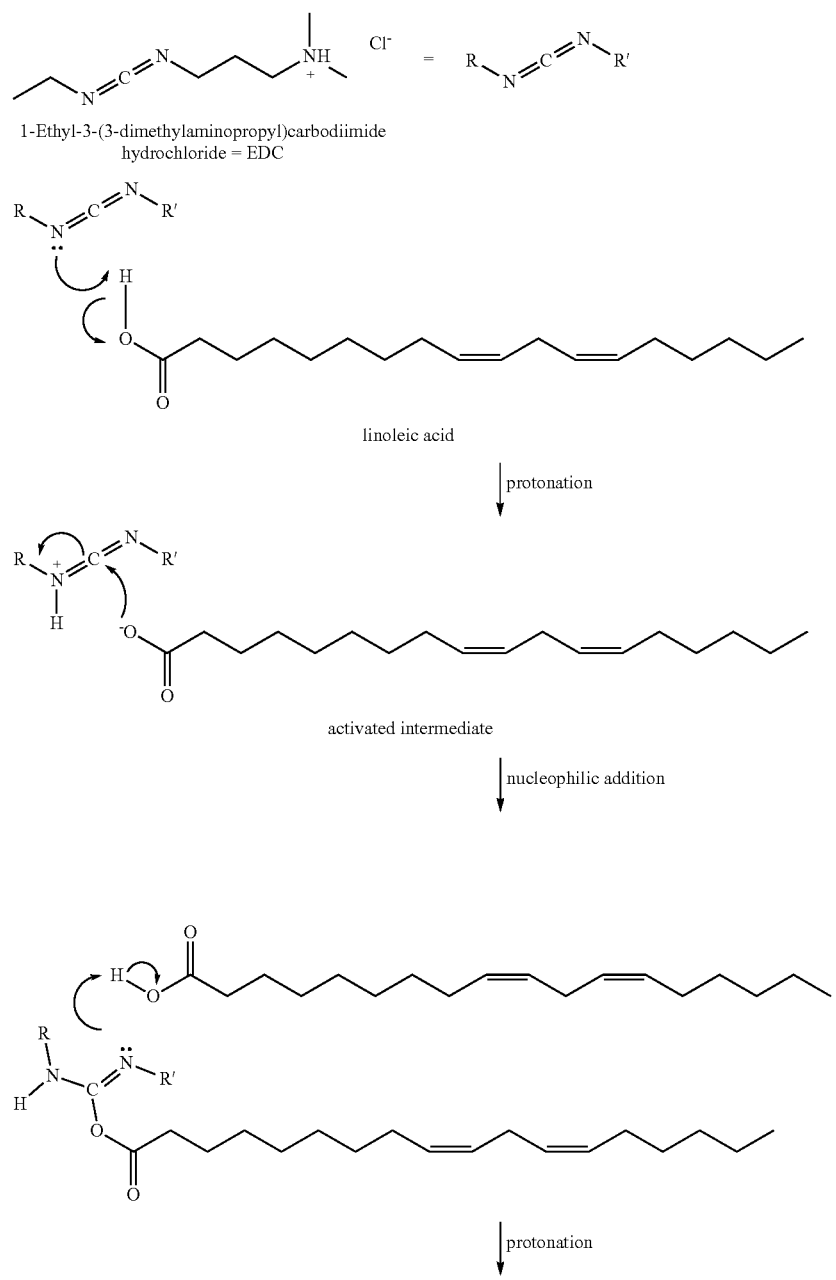

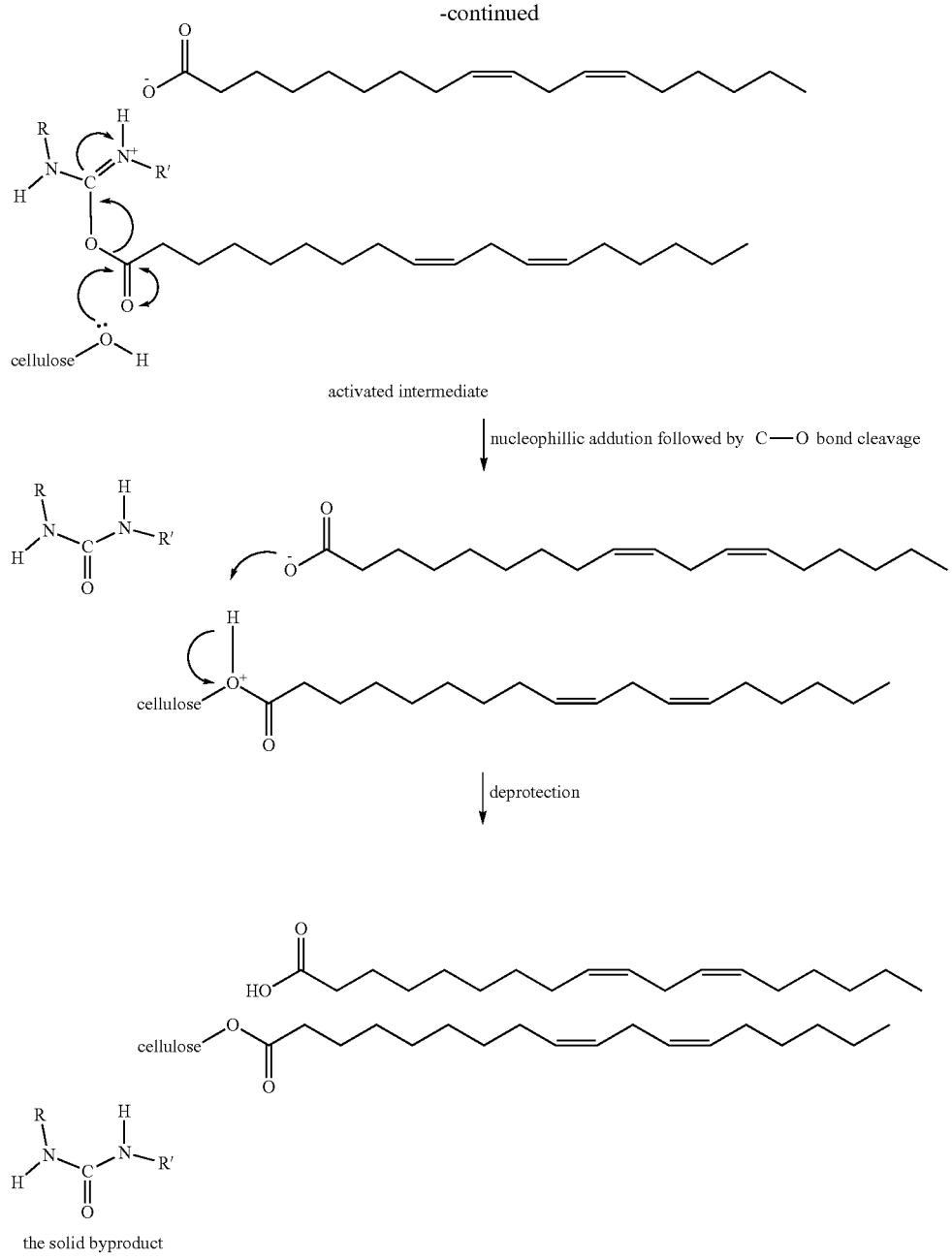

Hydrocarbon acid chlorides may, for example, be used as acylating agents in the acylation of cellulose fibres. Hydrocarbon acid chlorides may, for example, be prepared using oxalyl chloride and catalytic DMF.

Alternatively or additionally, acid anhydrides may be used as acylating agents in the acylation of cellulose fibres. Acid anhydrides may be prepared using Bartolli's method using magnesium chloride as a weak Lewis acid (e.g. as shown in the Scheme below). Alternatively, acid anhydrides may be prepared by forming the hydrocarbon acid chloride and reacting with a hydrocarbon acid salt.

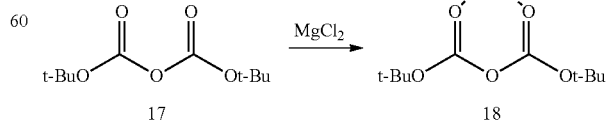

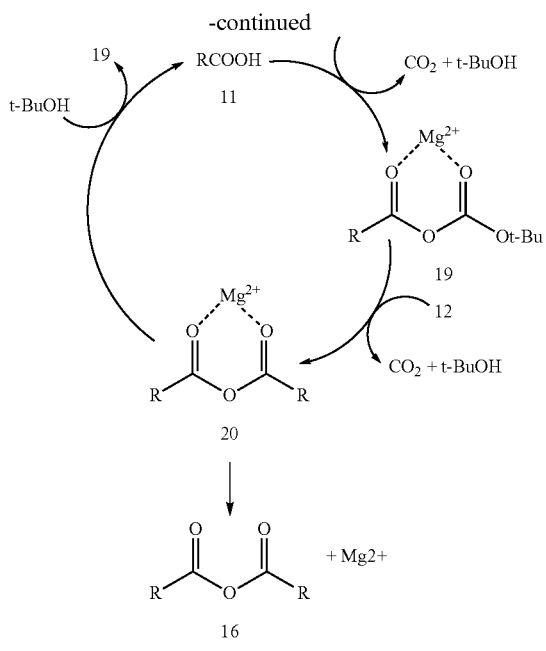

R = cis, cis-9, 12-Octadecadienyl

The acylation reaction may, for example, take place at any suitable temperature. For example, the reaction may take place under reflux conditions.

The cellulose fibres may be washed, for example with a solvent such as toluene, acetone, ethanol, water or a combination thereof. This may, for example, be followed by drying, for example in air, for example at room temperature.

In preferred methods, the hydrocarbon acids and cellulose fibres may be reacted using a carbodiimide coupling agent such as EDC. For example, the hydrocarbon acids and cellulose fibres may be reacted using EDC and DMAP. This may, for example, take place in the presence of a solvent such as DMF.

In an alternative preferred method, hydrocarbon acid anhydride and cellulose fibres may be reacted in the presence of a solvent such as pyridine.

Depending on the degree of esterification of the cellulose backbone, the products may vary from waxy solids to viscose liquids. Mixed esters are supplied by Eastman Chemicals, and find diverse uses in pharmaceutical drug delivery.

Infrared spectroscopy may be used to identify chemical bonds in the modified cellulosic product and thus confirm the identity of the product.

The "degree of substitution" may refer to the % of monomer units (e.g. anhydroglycose units in cellulose) having a hydrocarbon acid group attached. The modified cellulose fibres and/or cellulosic fabric may, for example, have a degree of substitution of at least about 0.1%, for example at least about 0.5% or at least about 1%. For example, the cellulose fibres and/or cellulosic fabric may have a degree of substitution ranging from about 0.1% to about 100%, for example from about 0.1% to about 60% or from about 0.1% to about 50% or from about 0.1% to about 40% or from about 0.1% to about 30% or from about 0.1% to about 20% or from about 0.1% to about 15% or from about 0.1% to about 10%.

Methods for Making Composite Materials

Any suitable method may be used to make the composite materials described herein. The modified cellulose fibres and/or cellulosic fabrics described herein may be embedded in a polymer matrix followed by curing of the polymer matrix.

The method comprises shaping the composite material into the article of manufacture simultaneously with and/or subsequently to forming the composite material. The method may, for example, comprise shaping the composite material simultaneously with forming the composite material, for example shaping the composite material into the article of manufacture directly as a prepreg.

The composite materials may be made by one or more of open mold processes such as sprayup or hand layup, a closed mold processes, a resin infusion process, resin transfer molding, reaction injection molding, vacuum-assisted resin transfer molding, resin film infusion, compression molding, injection molding, filament winding, pultrusion, tube rolling, automated fibre placement, automated tape laying, centrifugal casting and extrusion.

Uses of Composite Materials

The composite materials described herein may, for example, be used in any suitable applications. In particular, the composite materials described herein may be used in applications where good durability, water resistance and/or structural strength/engineering performance is required. The composite materials may also be used in applications where use of natural materials and/or biodegradability and/or recyclability and/or low cost and/or low weight is important.

The composite materials described herein may, for example, be used to make various vehicle parts, for example external or internal vehicle parts. In particular, the improved water resistance and engineering performance of the composite materials described herein may enable the composite materials to be used for external vehicle parts. Vehicle parts include, for example, door panels, door trim panels, floor mats, seat foams, The vehicles may, for example, be "pods", "pedelecs", automobiles, airplanes, motorbikes, bicycles, boats, canoes, kayaks, paddleboards, trains or the like.

The composite materials described herein may, for example, be used in building materials, for example in flooring, cladding or insulation. The composite materials described herein may be used in building materials for garden structures (e.g. outdoor storage, gazebos, logia, trellises etc.).

The composite materials described herein may, for example, be used in medical applications such as dressings.

The composite materials described herein may, for example, be used in furniture, for example garden furniture.

EXAMPLES

Example 1—Methods of Modifying Cellulose Fibres

1. Hydrolysis of Linseed Oil

Potassium hydroxide (132 g, 2.35 mol) was stirred vigorously in ethanol at room temperature, and linseed oil (500 ml, 465 ml, 0.53 mol eq) was added in one portion. The mixture was heated at reflux for one hour, then poured over ice (500 g) and acidified with concentrated hydrochloric acid (250 ml). The resulting oil was separated and the aqueous layer washed with hexane (300 ml.) The combined oil and hexane extract was washed with water (200 ml) and then brine (2×250 ml), and dried over sodium sulfate. Filtration and evaporation gave a red-brown oil (440 g). The 1H nuclear magnetic resonance (NMR) spectrum of the mixed acids was recorded in deuterochloroform solution (all integrals rounded to nearest whole number). 1H NMR (500 MHZ, Chloroform-d) δ 5.80-4.91 (m, 2H), 3.00-2.65 (m, 1H), 2.35 (t, J=7.5 Hz, 1H), 2.21-1.90 (m, 2H), 1.63 (q, J=7.3 Hz, 1H), 1.48-1.18 (m, 7H), 0.98 (t, J=7.6 Hz, 1H), 0.92-0.82 (m, 1H).

2. Acylation of Cellulose in Linen Fabric (Method 1)

EDC (60 g, 0.31 mol) and 4-(dimethylamino)pyridine (DMAP) (7.60 g, 0.062 mol) were stirred in DMF (700 mL) in a large crystallising dish, and 107 g of the hydrolysis products from linseed oil (0.39 mol equivalent of acids) was added in one portion. After stirring for 5 minutes, seven 18 cm diameter flax fabric discs (400 gsm) were immersed in the mixture. The dish covered tightly with aluminium foil, and the mixture was stirred for 20 hours. The disks were then removed from the dish, and transferred to a 20 cm Buchner filter containing one filter paper disk, and washed at the pump with acetone (1 L), ethanol (1 L), water (2 L) and ethanol (1 L) again. The disks were then laid on a flat surface to dry in air for three hours, and finally dried to constant weight in a vacuum desiccator over phosphorus pentoxide desiccant.

3. Infrared Analysis of Treated Material

The infrared spectrum of each dry fabric disc was recorded on a PerkinElmer Spectrum Two Fourier transform infrared (FT-IR) instrument, using an attenuated total reflectance (ATR) cell with four accumulations. The ester carbonyl appeared in the range 1737-1743 $cm^{-1}$ as a weak/medium strength signal. Free acid retained on certain disks appeared at 1710-1717 $cm^{-1}$ 4. Preparation of Anhydrides from Saponified Plant Oils Employing Bartolli's method (Salimon, J.; Abdullah, B. M.; Salih, N. Hydrolysis Optimization and Characterization Study of Preparing Fatty Acids from Jatropha Curcas Seed Oil. *Chem Cent J* 2011, 5, 67) using magnesium chloride as a weak Lewis acid. Linoleic acid was stirred in dry THF with a half equivalent of tert-butoxycarbonic anhydride (BOC anhydride) and 10 mol % of magnesium chloride hexahydrate for 18 hours. Quenching with water and extraction with diethyl ether, followed by drying over magnesium sulfate and evaporation, gave a colourless or pale yellow product with usually 16-35% unreacted acid.

5. Acylation of Cellulose in Linen Fabric (Method 2)

Reaction of linoleic anhydride with several flax fibre samples in pyridine at 115° C. resulted in acylation of the fibres in reasonable yield, as shown by ATR FT-IR of the material. Generally heating overnight was sufficient. Extended reaction times of 2-6 days made no difference to the intensity of the band at 1731-1740 $cm^{-1}$.

Example 2—Moisture Absorption of Modified Cellulose Fibres

Measurements of weight-gain against duration of exposure to water allow the water-uptake of biocomposite materials to be assessed. Plots of weight-gain against time allow the identification of the stage at which water saturation has occurred (the plots 'level out' and no further weight-gain is observed).

Thermogravimetric analysis (TGA) performed on saturated biocompostite samples measures the weight-loss on heating. The combined information from weight-gain and weight-loss measurements provides a reliable measure of water uptake. TGA also measures the temperature at which weight-loss from saturated samples occurs [weight-loss at 100° C. (the boiling point of water) supports the claim that it is the uptake of water into the biocomposite materials that is the cause of the weight-gain].

Flax fabric discs modified with linoleic acid (LIN 058), linseed acid (LIN 056), hemp acid (LIN 062) or soybean acid (LIN 060) by the method using EDC described in Example 1 above were prepared. Flax fabric discs treated by the EDC method described in Example 1 but without fatty acid (LIN 030), treated by the EDC method described in Example 1 but without fatty acid or EDC (i.e. treated with only solvents)(LIN 033) were also prepared as control samples. Untreated flax fabric discs were also used as a control.

These samples were embedded into a polymer matrix to form composite materials. Glass fibres were also used in place of the flax fabric discs as a control (LIN 010).

Figure 2:
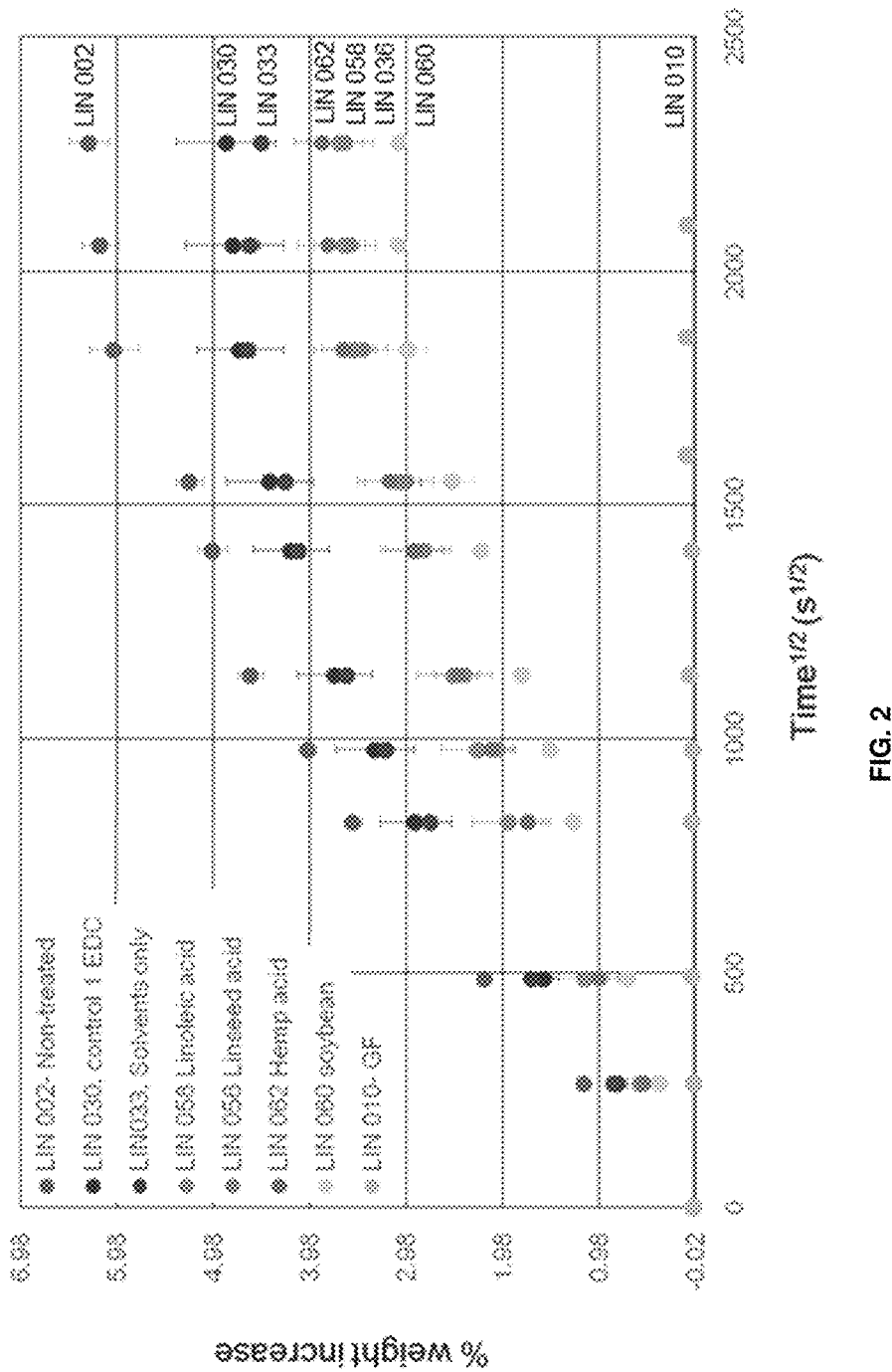
FIG. 2 shows the results of the water uptake experiment described in Example 2.

The moisture absorption of the various composite materials prepared was determined. It was found that the flax discs modified with linoleic acid, linseed acid, hemp acid and soybean acid gained significantly less weight than the control flax discs when soaked in water. Thus, the cellulose modified with linoleic acid, linseed acid, hemp acid and soybean acid had better resistance to water uptake and better durability. The results are shown in FIG. 2.

Embodiments of the Invention

The following numbered paragraphs define particular embodiments of the present invention:

1. A composite material comprising a matrix having modified cellulose fibres and/or modified cellulosic fabric embedded therein, wherein the cellulose fibres and/or cellulosic fabric is modified with one or more hydrocarbon acids having a carbon number of at least about 6.
2. The composite material of any preceding paragraph, wherein the modified cellulose fibres are in the form of a fabric, for example a woven fabric.
3. The composite material of any preceding paragraph, wherein one or more hydrocarbon acids has a carbon number equal to or less than about 30.
4. The composite material of any preceding paragraph, wherein one or more hydrocarbon acids has a carbon number ranging from about 10 to about 30, for example from about 15 to about 25.
5. The composite material of any preceding paragraph, wherein one or more hydrocarbon acid is derived from a plant oil.
6. The composite material of any preceding paragraph, wherein one or more hydrocarbon acid is derived from linseed oil, soy-bean oil, rapeseed oil, hemp oil or a combination thereof.
7. The composite material of any preceding paragraph, wherein one or more hydrocarbon acid includes one or more of linolenic acid, linoleic acid, palmitic acid, stearic acid and oleic acid.
8. The composite material of any preceding paragraph, wherein the one or more hydrocarbon acids includes linolenic acid and/or linoleic acid.
9. The composite material of any preceding paragraph, wherein the matrix is biodegradable.
10. The composite material of any preceding paragraph, wherein the matrix comprises one or more of a polyester resin, an epoxy resin and a fatty acid resin.
11. An article of manufacture formed at least in part from a composite material of any preceding paragraph.
12. A method of forming a composite material comprising a matrix having modified cellulose fibres and/or modified cellulosic fabric embedded therein, wherein the method comprises: (1) modifying one or more cellulose fibres and/or cellulosic fabric by reacting the fibre and/or cellulosic fabric with one or more hydrocarbon acids having a carbon number of at least about 6 under conditions capable of forming modified cellulose fibres and/or modified cellulosic fabric; and (2) embedding the one or more modified cellulose fibres and/or the modified cellulosic fabric modified by the procedure of (1) above in a matrix to obtain the composite material.

13. The method of paragraph 12, wherein the one or more cellulose fibres are in the form of a fabric, for example a woven fabric.

14. The method of paragraph 12 or 13, wherein one or more hydrocarbon acids are according to any one of paragraphs 3 to 8.

15. The method of any of paragraphs 13 to 15, wherein the matrix is according to any of paragraphs 9 to 11.

16. The method of any of paragraphs 12 to 15, wherein the modified cellulose fibres and/or modified cellulosic fabric is formed by reacting the cellulose fibres and/or cellulosic fabric with hydrocarbon acid anhydride.

17. The method of any of paragraphs 12 to 15, wherein the modified cellulose fibres and/or modified cellulosic fabric is formed by reacting the cellulose fibres and/or cellulosic fabric with the one or more hydrocarbon acids in the presence of one or more ester coupling reagents.

18. The method of paragraph 17, wherein the one or more ester coupling reagents comprises DMAP, DCC and EDS.

19. A method of forming an article of manufacture, the method comprising forming a composite material according to the method of any one of paragraphs 12 to 18 and simultaneously with and/or subsequently to the said forming, shaping the composite material into the article of manufacture.

20. A modified cellulose fibre and/or modified cellulosic fabric for use in reinforcing a matrix of a composite material, wherein the modified cellulose fibre and/or modified cellulosic fabric is modified with one or more hydrocarbon acids having a carbon number of at least about 6.

21. The modified cellulose fibre and/or modified cellulosic fabric of paragraph 20, wherein the cellulose fibre is in the form of a fabric, for example a woven fabric.

22. The modified cellulose fibre and/or modified cellulosic fabric of paragraph 20 or 21, wherein one or more hydrocarbon acid is according to any of paragraphs 3 to 8.

The foregoing broadly describes certain embodiments of the present invention without limitation. Variations and modifications as will be readily apparent to those skilled in the art are intended to be within the scope of the present invention as defined in and by the appended claims.

The invention claimed is:

1. A composite material comprising a matrix having modified cellulose fibres and/or modified cellulosic fabric embedded therein, wherein the cellulose fibres and/or cellulosic fabric is modified with one or more hydrocarbon acids having a carbon number of at least about 6, wherein the one or more hydrocarbon acids include an acid selected from the group consisting of linseed acid, hempseed acid and combinations thereof, wherein the modification covalently links the one or more hydrocarbon acids to the cellulose fibres and/or cellulosic fabric.

2. The composite material of claim 1, wherein the linseed acid is obtained by hydrolysis of linseed oil or the hempseed acid is obtained by hydrolysis of hemp oil.

3. The composite material of claim 1, wherein the matrix is a polymer matrix.

4. An article of manufacture formed at least in part from a composite material of claim 1.

5. The composite material of claim 1, wherein the matrix is a biodegradable resin.

6. The composite material of claim 1, wherein the modification covalently links the one or more hydrocarbon acids to the cellulose fibres and/or cellulosic fabric via an ester linkage.

7. The composite material of claim 1, wherein the one or more hydrocarbon acids comprise linseed acid.

8. The composite material of claim 1, wherein the one or more hydrocarbon acids further comprise rapeseed acid.

9. The composite material of claim 1, wherein the one or more hydrocarbon acids further comprise soybean acid.

10. The composite material of claim 1, wherein the one or more hydrocarbon acids comprise hempseed acid.

11. The composite material of claim 1, wherein the cellulose is extracted from one or more of flax, cotton, hemp, coir, jute, manila, ramie, sisal, coconut husk, bamboo or wood pulp.

12. The composite material of claim 1, wherein the cellulose fibres are woven flax fibres.

13. The composite material of claim 1, wherein the cellulosic fabric has a weight ranging from about 10 gsm to about 1000 gsm.

14. The composite material of claim 1, wherein the cellulose fibres have an average diameter equal to or greater than about 1 μm.

15. The composite material of claim 1, wherein the matrix comprises one or more of a polyester resin, an epoxy resin and a fatty acid resin.

16. A composite material comprising a matrix having modified cellulose fibres and/or modified cellulosic fabric embedded therein, wherein the cellulose fibres and/or cellulosic fabric is modified with one or more hydrocarbon acids having a carbon number of at least about 6,
wherein the one or more hydrocarbon acids include an acid selected from the group consisting of linseed acid, rapeseed acid, soybean acid, hempseed acid, and combinations thereof,
wherein the cellulosic fabric has a weight ranging from about 10 gsm to about 1000 gsm, and
wherein the modification covalently links the one or more hydrocarbon acids to the cellulose fibres and/or cellulosic fabric.

17. A composite material comprising a matrix having modified cellulose fibres and/or modified cellulosic fabric embedded therein, wherein the cellulose fibres and/or cellulosic fabric is modified with one or more hydrocarbon acids having a carbon number of at least about 6,
wherein the one or more hydrocarbon acids include an acid selected from the group consisting of linseed acid, rapeseed acid, soybean acid, hempseed acid, and combinations thereof, and
wherein the cellulose fibres have an average diameter equal to or greater than about 1 μm, and
wherein the modification covalently links the one or more hydrocarbon acids to the cellulose fibres and/or cellulosic fabric.

18. The composite material of claim 16, wherein the linseed acid is obtained by hydrolysis of linseed oil, the soybean acid is obtained by hydrolysis of soy-bean oil, the rapeseed acid is obtained by hydrolysis of rapeseed oil, or the hempseed acid is obtained by hydrolysis of hemp oil.

19. The composite material of claim 17, wherein the linseed acid is obtained by hydrolysis of linseed oil, the soybean acid is obtained by hydrolysis of soy-bean oil, the rapeseed acid is obtained by hydrolysis of rapeseed oil, or the hempseed acid is obtained by hydrolysis of hemp oil.

\* \* \* \* \*